United States Patent
Häberle et al.

(10) Patent No.: US 11,846,219 B2
(45) Date of Patent: Dec. 19, 2023

(54) EXHAUST GAS HEATER

(71) Applicant: Purem GmbH, Neunkirchen (DE)

(72) Inventors: Jürgen Häberle, Stuttgart (DE); Arnulf Spieth, Hochdorf (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/822,482

(22) Filed: Aug. 26, 2022

(65) Prior Publication Data

US 2023/0067903 A1 Mar. 2, 2023

(30) Foreign Application Priority Data

Aug. 26, 2021 (DE) ..................... 10 2021 122 085.8

(51) Int. Cl.
| | |
|---|---|
| *F01N 3/00* | (2006.01) |
| *F01N 3/027* | (2006.01) |
| *F01N 3/20* | (2006.01) |
| *H05B 3/12* | (2006.01) |
| *H05B 3/26* | (2006.01) |

(52) U.S. Cl.
CPC ........... *F01N 3/027* (2013.01); *F01N 3/2013* (2013.01); *H05B 3/12* (2013.01); *H05B 3/265* (2013.01); *F01N 2240/16* (2013.01); *H05B 2203/016* (2013.01); *H05B 2203/022* (2013.01)

(58) Field of Classification Search
CPC .... F01N 3/027; F01N 3/2013; F01N 2240/16; H05B 3/12; H05B 3/265; H05B 2203/016; H05B 2203/022
See application file for complete search history.

(56) References Cited

U.S. PATENT DOCUMENTS

| 342,324 | A | * | 5/1886 | Brandon | H01B 17/22 174/99 R |
|---|---|---|---|---|---|
| 3,176,117 | A | * | 3/1965 | Knoll | F24H 3/0411 338/297 |
| 4,723,973 | A | * | 2/1988 | Oyobe | F01N 3/027 60/303 |
| 5,465,573 | A | * | 11/1995 | Abe | F01N 13/0097 422/171 |

(Continued)

FOREIGN PATENT DOCUMENTS

| DE | 20 2021 102 620 U1 | 7/2021 |
|---|---|---|
| DE | 10 2021 109 568 A1 | 9/2022 |
| EP | 3 825 528 A1 | 5/2021 |

*Primary Examiner* — Matthew T Largi
(74) *Attorney, Agent, or Firm* — Walter Ottesen, P.A.

(57) ABSTRACT

An exhaust gas heater for an exhaust gas system of an internal combustion engine includes a carrier arrangement, a heating-conductor arrangement, carried on the carrier arrangement and having at least one heating conductor through which a current flows with at least one heating conductor being carried in an electrically insulated manner with respect to the carrier arrangement by at least one carrier-element supporting unit and/or with at least one heating conductor being carried in an electrically insulated manner with respect to a further heating conductor by at least one heating-conductor supporting unit. A connecting arrangement securely connects the heating-conductor arrangement to the carrier arrangement and also a length-compensating arrangement for compensating for different thermal expansions of components of the exhaust gas heater.

9 Claims, 3 Drawing Sheets

(56) References Cited

U.S. PATENT DOCUMENTS

| | | | | |
|---|---|---|---|---|
| 5,935,473 | A * | 8/1999 | Hashimoto | H05B 3/08 |
| | | | | 219/205 |
| 6,031,213 | A * | 2/2000 | Hashimoto | F01N 3/2026 |
| | | | | 422/174 |
| 10,598,064 | B2 * | 3/2020 | Everly | F01N 3/2013 |
| 10,961,887 | B2 * | 3/2021 | Huang | F02D 41/0235 |
| 2010/0237059 | A1 * | 9/2010 | Porterfield | H05B 3/16 |
| | | | | 29/611 |
| 2014/0190151 | A1 * | 7/2014 | Culbertson | H05B 3/44 |
| | | | | 60/303 |
| 2017/0273146 | A1 * | 9/2017 | Everly | H05B 3/16 |
| 2020/0072107 | A1 * | 3/2020 | Aufranc | F01N 3/2013 |
| 2021/0123369 | A1 * | 4/2021 | Sommier | F01N 3/2825 |
| 2021/0156289 | A1 | 5/2021 | Kurpejovic et al. | |
| 2022/0186647 | A1 | 6/2022 | Saurat et al. | |

\* cited by examiner

EXHAUST GAS HEATER

CROSS REFERENCE TO RELATED APPLICATION

This application claims priority of German patent application no. 10 2021 122 085.8, filed Aug. 26, 2021, the entire content of which is incorporated herein by reference.

TECHNICAL FIELD

The present disclosure relates to an exhaust gas heater with which heat in an exhaust gas system of a motor vehicle can be transmitted to the exhaust gas flowing therein that has been discharged from an internal combustion engine, in order thereby to bring areas of the system that are arranged upstream of the exhaust gas heater, such as for example catalytic converters or particle filters, more quickly to operating temperature, in particular in a starting phase of the operation of an internal combustion engine.

BACKGROUND

The subsequently published German patent application DE 10 2021 109 568 discloses an exhaust gas heater in which, between two substantially plate-like carrier elements of a carrier arrangement that are constructed from a sheet-metal material, two heating conductors of a heating-conductor arrangement that have been provided by cutting out from a flat material and are of a substantially plate-like or two-dimensional form are arranged following one another in a main direction of exhaust gas flow corresponding to a longitudinal direction of the exhaust gas heater. The layered construction including the carrier elements and heating conductors arranged between them is held together by a connecting arrangement including a plurality of connecting elements of a bolt-like form. In order to achieve electrical insulation of the heating conductors with respect to the carrier elements or else with respect to one another, a number of supporting units of electrically insulating material, for example ceramic material, are respectively arranged between them. The layered construction including the carrier elements, heating conductors and supporting units arranged between them is held together by the connecting elements of the connecting arrangement.

SUMMARY

An object of the present disclosure is to provide an exhaust gas heater for which it is ensured that the carrier arrangement is stably held together with the heating-conductor arrangement irrespective of the temperature.

According to the disclosure, an exhaust gas heater for an exhaust gas system of an internal combustion engine includes:
 a carrier arrangement,
 a heating-conductor arrangement, carried on the carrier arrangement and having at least one heating conductor through which a current flows, with at least one heating conductor being carried in an electrically insulated manner with respect to the carrier arrangement by at least one carrier-element supporting unit and/or with at least one heating conductor being carried in an electrically insulated manner with respect to a further heating conductor by at least one heating-conductor supporting unit,
 a connecting arrangement for securely connecting the heating-conductor arrangement to the carrier arrangement,
 a length-compensating arrangement for compensating for different thermal expansions of components of the exhaust gas heater.

Since the various components of such an exhaust gas heater, that is, in particular the carrier arrangement, the heating-conductor arrangement as well as the supporting units supporting them with respect to one another and also the connecting arrangement providing that they are securely held together are generally constructed from different materials, they experience different thermally induced expansions when they undergo heating by an exhaust gas flowing through such an exhaust gas heater. At relatively low temperatures, the components that are held against one another in a braced manner by the connecting arrangement, the carrier arrangement, the heating-conductor arrangement and the supporting units, provide a stable assembly. If for example the connecting arrangement expands to a greater extent when it undergoes heating by an exhaust gas flowing through an exhaust gas heater than the components of the exhaust gas heater that are held together by it, the bracing may be lost and relative movements of the components of the exhaust gas heater that are then movable, at least to a slight extent, with respect to one another may occur and lead to damage and/or noise. This is avoided in the case of the construction according to the disclosure by the length-compensating arrangement compensating for such different thermal expansions of different components of the exhaust gas heater in such a way that, irrespective of the temperature of the components of the exhaust gas heater, they are stably held together by the connecting arrangement.

For a construction that can be easily realized, the connecting arrangement may include at least one preferably bolt-like connecting element, and the length-compensating arrangement may include at least one length-compensating element in the connecting-force transmission path between at least one connecting element and the carrier arrangement and/or the heating-conductor arrangement.

The carrier arrangement may include two carrier elements, following one another in the direction of a longitudinal axis of the exhaust gas heater and receiving the heating-conductor arrangement between them. In order to be able to provide the length-compensating effect reliably in the case of such a layered construction, it is proposed that the length-compensating arrangement includes, in assignment to at least one, preferably each connecting element, at least one length-compensating element in the supporting path between at least one of the carrier elements and the heating-conductor arrangement and/or in the supporting path between two heating conductors of the heating-conductor arrangement and/or in the supporting path between at least one carrier element and at least one connecting element.

For this purpose, it may be provided for example that at least one, preferably each length-compensating element is arranged between a carrier element and a carrier-element supporting unit, and/or that at least one, preferably each length-compensating element is arranged between two heating conductors, and/or that at least one, preferably each length-compensating element is arranged between a carrier element and a supporting region of a connecting element supporting itself on the carrier element.

In order to ensure defined positioning of the length-compensating arrangement in the exhaust gas heater, it is proposed that at least one, preferably each connecting element passes through at least one length-compensating element and passes through at least one carrier-element supporting unit and/or at least one heating-conductor supporting unit. Consequently, in assignment to at least one connecting element, a stack held together by it and including one or more supporting units and one or more length-compensating elements is provided.

For providing the length-compensating function, at least one, preferably each length-compensating element may be constructed from a material with a greater coefficient of thermal expansion than the material of the at least one connecting element. It is in this way ensured that such a length-compensating element expands to a greater extent when it undergoes heating than the connecting element or elements, so that a bracing of the various components of the exhaust gas heater that is generated by the connecting elements is maintained even when they undergo heating.

For example, when the at least one connecting element is constructed from a nickel-chromium alloy material, the at least one length-compensating element may be constructed from a steel material, preferably 1.4980 steel.

In a further configuration, the length-compensating function may be achieved by at least one, preferably each length-compensating element including an elastically deformable prestressing element.

For example, at least one, preferably each length-compensating element may be formed as a plate spring or corrugated spring.

For a construction that is mechanically stable and resistant to exhaust gas, the carrier arrangement may be constructed from a metal material. The heating-conductor arrangement too may be constructed from a metal material, in particular from a metal material which, because of its electrical resistance, is heated when an electrical voltage is applied.

The disclosure also relates to an exhaust gas system for an internal combustion engine including at least one exhaust gas heater constructed according to the disclosure.

BRIEF DESCRIPTION OF THE DRAWINGS

The invention will now be described with reference to the drawings wherein.

DESCRIPTION OF THE PREFERRED EMBODIMENTS

Figure 1:
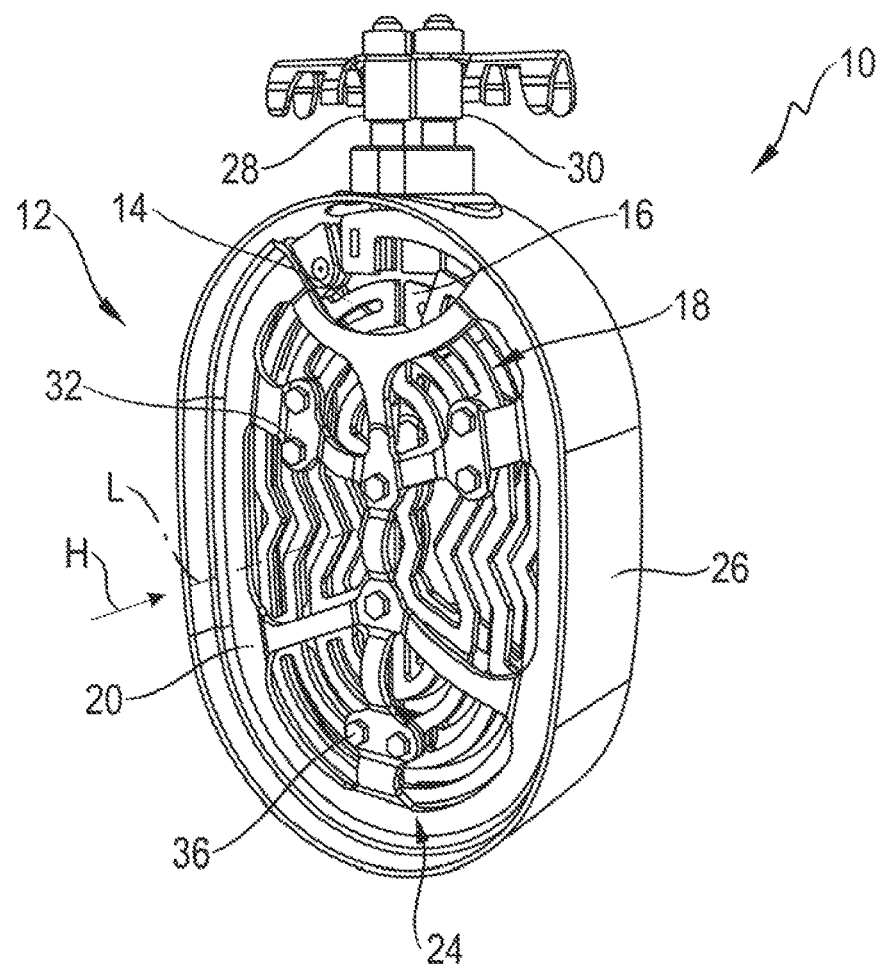
FIG. 1 shows a perspective view of an exhaust gas heater.
Figure 2:
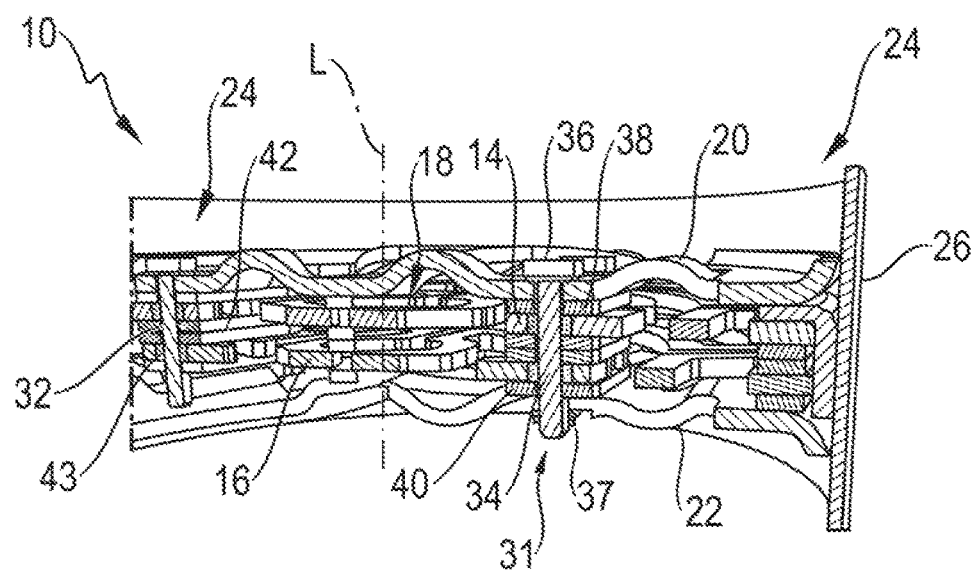
FIG. 2 shows a longitudinal sectional view of the exhaust gas heater from FIG. 1.

In FIGS. 1 and 2, an exhaust gas heater 10 for an exhaust gas system 12 of an internal combustion engine, for example on a motor vehicle, is shown. In the exhaust gas system 12, the exhaust gas heater 10 can be flowed through by exhaust gas in a main direction H of exhaust gas flow and has two heating conductors 14, 16 of a heating-conductor arrangement, denoted generally by 18, which are arranged following one another in the direction of a longitudinal axis L of the exhaust gas heater and consequently can be flowed around one after the other by exhaust gas flowing substantially in the main direction H of exhaust gas flow. The heating conductors 14, 16 are constructed as substantially plate-like or from flat material and can be produced with their structure that is provided with a plurality of portions running in a meandering structure by cutting out from a blank of flat material, in particular a metal blank.

On the sides of the two heating conductors 14, 16 that are lying facing away from one another in the direction of the longitudinal axis L of the exhaust gas heater, carrier elements 20, 22 of a carrier arrangement denoted generally by 24 that are of a substantially plate-like configuration are provided. On their outer circumferential region, the plate-like carrier elements 20, 22 are fixed on a substantially cylindrical carrier housing 26.

The two heating conductors 14, 16 may be arranged in series or parallel to one another. Provided for electrical connection to a voltage source are two connecting units 28, 30, which pass through the carrier housing 26 and are connected in an electrically conducting manner to the heating conductors 14, 16 in the interior space surrounded by the carrier housing 26.

To obtain a stable assembly, the two carrier elements 20, 22 and the heating conductors 14, 16 arranged between them, lying directly adjacent to one another, are securely connected to one another by a connecting arrangement 31 with a plurality of connecting elements 32 of a bolt-like form. The connecting elements 32 may for example be formed as screw bolts with a shank 34 and a head 36. A nut element 37 may be screwed onto the shank 34, for example, in order to clamp the layered construction including the carrier elements 20, 22 and heating conductors 14, 16 between the head 36 and the nut element 37.

To achieve electrical insulation of the heating conductors 14, 16 with respect to the carrier elements 20, 22 of the carrier arrangement 24, which are generally constructed from a metal material, provided between the heating conductor 14 and the carrier element 20, for example in assignment to each connecting element 32, is a carrier-element supporting unit 38, which is constructed from an electrically insulating material, for example a ceramic material, is of a substantially plate-like form and is passed through by the assigned connecting element 32 in the region of an opening provided in it. Also provided, for example in assignment to each connecting element 32, is a carrier-element supporting unit 40, arranged between the heating conductor 16 and the carrier element 22. The carrier-element supporting units 38, 40 may for example be substantially structurally the same as one another.

In order to support the two heating conductors 14, 16 lying next to one another with respect to one another in an electrically insulating manner, provided for example in assignment to each connecting element 32 is a heating-conductor supporting unit 42. Also each heating-conductor supporting unit 42 is of a substantially plate-like form, including one or more disks, and is constructed from a ceramic material. Where the heating conductors 14, 16 are passed through by the connecting element 32, sleeve-like insulating elements 43 may be inserted into the openings formed in the heating conductors 14, 16, in order to achieve defined positioning of the connecting element 32 in the openings provided in the heating conductors 14, 16.

Figure 3:
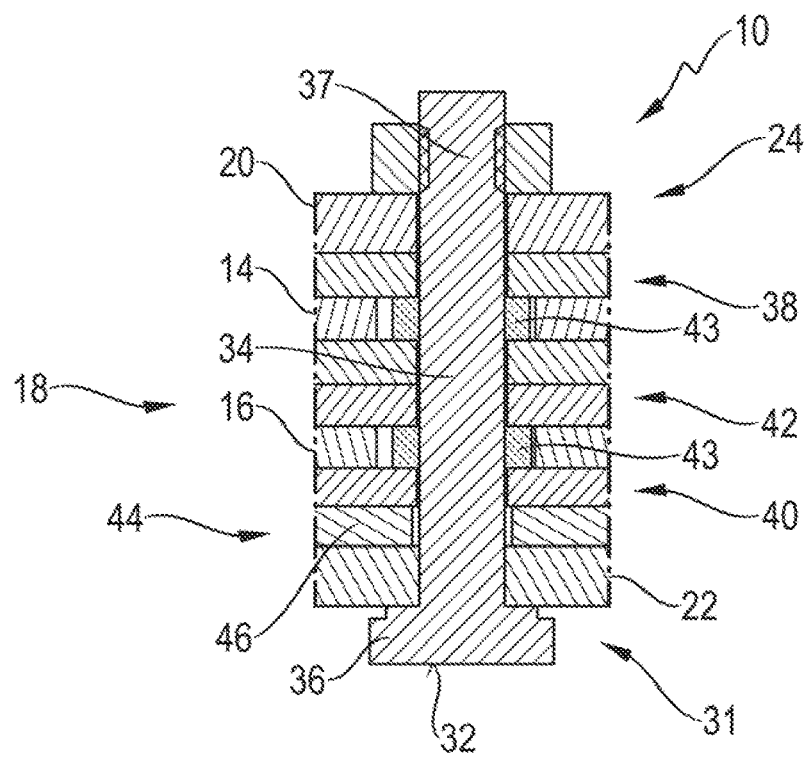
FIG. 3 shows a longitudinal section of an exhaust gas heater with carrier-element supporting units and a length-compensating element of a length-compensating arrangement, arranged in assignment to a connecting element, in a schematic representation.

FIG. 3 shows in conjunction with a connecting element 32 the construction of an exhaust gas heater 10 in which different thermal expansions of the various components of the exhaust gas heater 10 are compensated for by providing a length-compensating arrangement denoted generally by 44. It should be taken into consideration that, in the layered construction including the two carrier elements 20, 22 and the heating conductors 14, 16 as well as the carrier-element supporting units 38, 40 or the heating-conductor supporting units 42 arranged between them, these various components have different construction materials from one another, in particular different construction materials than the or each connecting element 32. Such different construction materials generally have different coefficients of thermal expansion, which may have the consequence that different thermally induced expansions when they undergo heating by the exhaust gas flowing through the exhaust gas heater 10 may lead to a loss of the bracing built up in the cold state by the connecting elements 32. The components of the exhaust gas heater 10 which are held between the head 36 and the nut element 37 and each provide a supporting region of a connecting element 32, may then get into a state in which they have an amount of play in terms of movement in the direction of the longitudinal axis L of the exhaust gas heater.

Such different thermal expansions are compensated for by the length-compensating arrangement 44 such that, even when the exhaust gas heater 10 is heated, the components of the exhaust gas heater 10 that are held together by the connecting elements 32 are stably held against one another by being braced. In order to achieve this, the length-compensating arrangement 44 includes, for example in assignment to each connecting element 32, a length-compensating element 46 of a disk-like or annular disk-like form. Like the various supporting units 38, 40, 42, it may be passed through by the assigned connecting element 32, or its shank 34, so that a stack including the supporting units 38, 40, 42 and a length-compensating element 46 that is also stably held together transversely to the longitudinal axis L of the exhaust gas heater is produced.

In the example of a configuration that is shown, the length-compensating element 46 assigned to the connecting element 32 shown is arranged between the carrier element 22 that is acted upon by the head 36 of the connecting element 32, and therefore supports it, and the carrier-element supporting unit 40 adjacent to this element. The length-compensating element 46 is constructed from a material which has a greater coefficient of thermal expansion than the construction material of the connecting element 32. If the connecting element 32 expands when it undergoes heating in the direction of the longitudinal axis L of the exhaust gas heater, the length-compensating element 46 also expands in this direction, and does so to a greater extent than the connecting element 32. It should also be taken into consideration here that the connecting element 32 has a much greater length of extent in the direction of the longitudinal axis L of the exhaust gas heater than the length-compensating element 46. Since, because of its comparatively great length of extent in the longitudinal direction L of the exhaust gas heater, the thermally induced relative change in length of the connecting element 32 leads to a comparatively great absolute change in length, the length-compensating element 46 is constructed from a material of which the relative change in length when it undergoes heating is so great that, in spite of the shorter length of extent of the length-compensating element 46 in the direction of the longitudinal axis L of the exhaust gas heater, the absolute change in length of the length-compensating element 46 compensates at least for the absolute change in length of the connecting element 32. It should also be taken into consideration here that the other components of the exhaust gas heater 10 that are arranged between the two carrier elements 20, 22, that is, the various supporting units 38, 40, 42 as well as the heating conductors 14, 16 and also the carrier elements 20, 22, also themselves experience an at least slight increase in their length of extent in the direction of the longitudinal axis L of the exhaust gas heater as a result of the heating they undergo, and therefore this already compensates for part of the change in length of the connecting element 32. Only the part of the absolute change in length of the connecting element 32 that is not compensated for by the change in length of these components must be compensated for by the change in length of the length-compensating element 46.

If, for example, in the case of the construction shown in FIG. 3, the two carrier elements 20, 22 are constructed from a steel sheet-metal material, the heating conductors 14, 16 are constructed from a metal material which, because of its electrical resistance, can be heated when a voltage is applied, the various supporting units 38, 40, 42 are constructed from a ceramic material and the connecting element 32 is constructed from a metal material, such as for example a nickel-chromium alloy material, the length-compensating element 46 may be constructed from a steel material, for example 1.4980 steel, in order to achieve the desired compensation for the change in length of the connecting element 32.

It should be pointed out that, preferably in assignment to each of the connecting elements 32 of the exhaust gas heater 10, the length-compensating arrangement 44 has such a length-compensating element 46. It should also be pointed out that such a length-compensating element 46 could also be arranged at a different location. For example, it could also be arranged between the carrier element 20 and the carrier-element supporting unit 38 or between one of the carrier-element supporting units 38, 40 and the heating conductor 14 or 16 that is respectively directly adjacent to it. A length-compensating element 46 could also be positioned between the two heating conductors 14, 16, for example between the heating-conductor supporting unit 42 and one of the heating conductors 14, 16, or between two disk-like parts of the heating-conductor supporting unit 42.

Depending on the extent to which a thermally induced change in length, in particular of the connecting element 32, has to be compensated for, it is also possible to provide a number of length-compensating elements 46 in the stacked assembly, for example at the previously stated positions.

Figure 4:
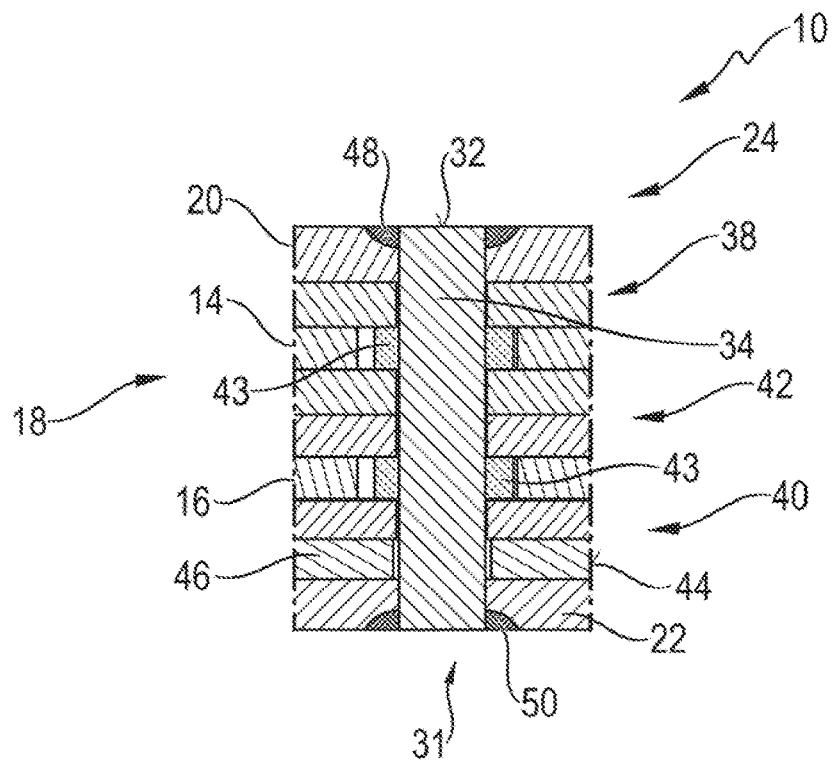
FIG. 4 shows a representation corresponding to FIG. 3 of an alternative type of configuration; and, FIG. 5 shows a further representation corresponding to FIG. 3 of an alternative type of configuration.

An alternative type of configuration is shown in FIG. 4. This differs from the previously described construction substantially in that the connecting element 32 of a bolt-like construction is connected in a material-bonding and consequently secure manner to the two carrier elements 20, 22 at the axial end regions thereof in each case by a welding 48, 50. In the case of this construction, the stack including the carrier elements 20, 22, heating conductors 14, 16 and supporting units 38, 40, 42 can be held such that they are braced against one another during assembly and, in this state, the connecting element 32 can be securely connected at both its axial end regions to the carrier elements 20, 22 by the weldings 48, 50. Also in this case, a length-compensating arrangement 44 with at least one length-compensating element 46 is provided in assignment to preferably each connecting element 32.

Figure 5:
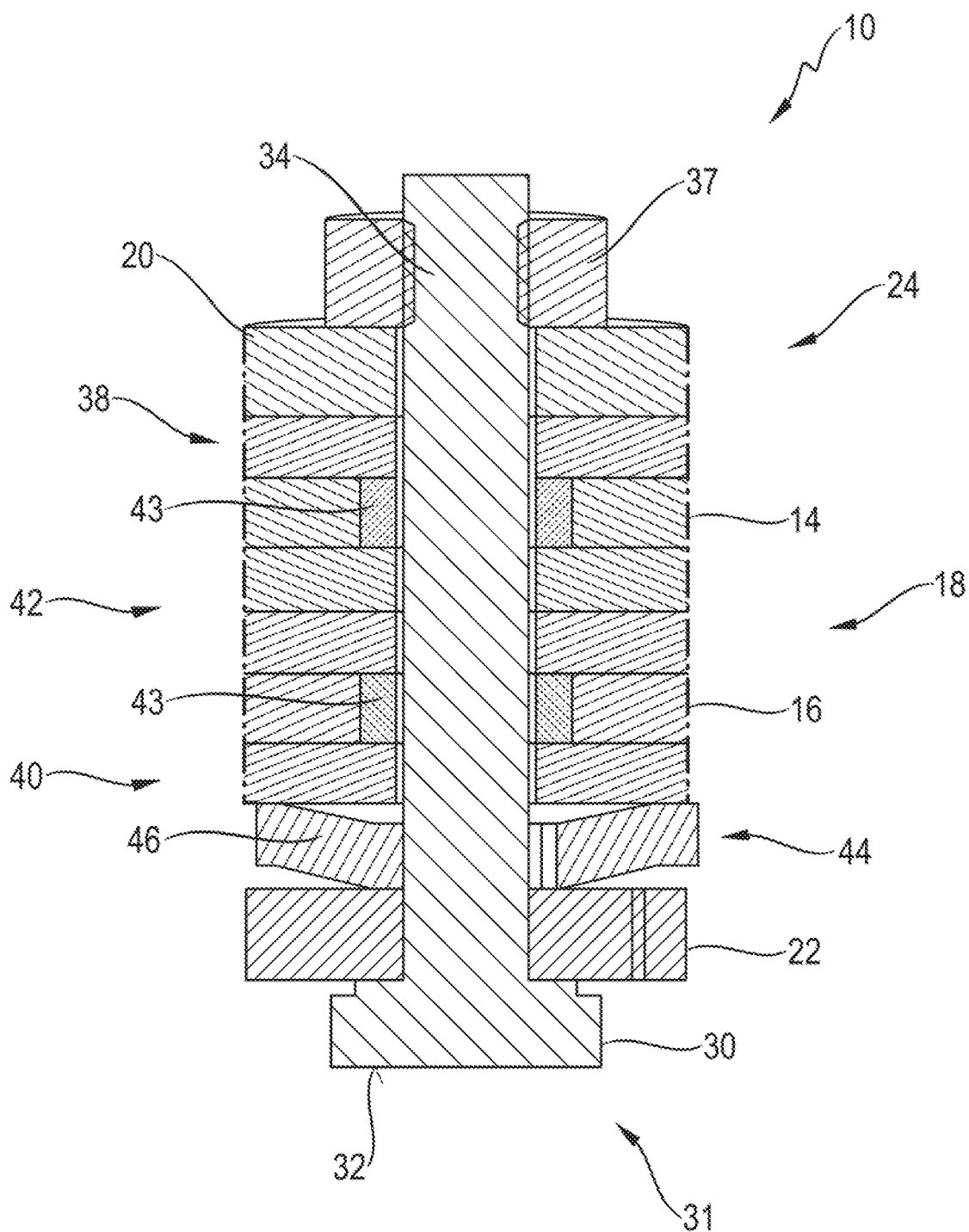

A further alternative type of configuration is shown in FIG. 5. In the case of this construction, the length-compensating element 46 provided in assignment to the connecting element 32, formed for example as a screw bolt, is formed as an elastically deformable prestressing element, in particular as a plate spring. As a result of its axial prestressing, the length-compensating element 46 holds the components of the exhaust gas heater 10 that are stacked one on top of the other, that is, the two carrier elements 20, 22, the heating conductors 14, 16 and the supporting units 38, 40, 42 arranged in between, against one another with prestressing even when there is a thermally induced change in length of the connecting element 32. In particular in the case of the configuration as a plate spring or corrugated spring constructed from a metal material, such a length-compensating element 46 ensures that the prestressing force generated by it is reliably maintained in the temperature range in which an exhaust gas heater 10 experiences temperature changes.

It should finally be pointed out that the previously described configurations of a length-compensating arrangement can be varied in a wide variety of aspects. As already mentioned, a number of length-compensating elements may also be arranged at different axial positions in assignment to one or more connecting elements. As an alternative or in addition, a length-compensating element could also be arranged on the outer side of one or both carrier elements 20 that is facing away from the heating conductors, so that it is arranged between a respective carrier element 20, 22 and a supporting region of the connecting element, that is, for example, the head 36 or the nut element 37. Also in the case of such a configuration, the length-compensating element 46 may may either be formed as an elastically deformable prestressing element producing a prestressing force, that is, for example, as a plate spring or corrugated spring, or be constructed from a material which, because of its greater coefficient of thermal expansion, compensates for the comparatively great absolute change in length of the connecting element 32.

It is understood that the foregoing description is that of the preferred embodiments of the invention and that various changes and modifications may be made thereto without departing from the spirit and scope of the invention as defined in the appended claims.

What is claimed is:

1. An exhaust gas system for an internal combustion engine, the exhaust gas system comprising:
    an exhaust gas heater defining a longitudinal axis (L) and including:
        a carrier arrangement including two carrier elements following one another in the direction of said longitudinal axis (L);
        a heating-conductor arrangement carried on said carrier arrangement and having at least one heating conductor through which current flows, said two carrier elements of said carrier arrangement accommodating said heating conductor arrangement therebetween;
        at least one carrier-element supporting unit for carrying said at least one heating conductor in an electrically insulating manner with respect to said carrier arrangement;
        a connecting arrangement for securely connecting said heating-conductor arrangement to said carrier arrangement, said connecting arrangement including at least one connecting element configured as a bolt extending in the direction of said longitudinal axis (L) and passing through said at least one carrier-element supporting unit; and,
        a length-compensating arrangement for compensating for different thermal expansions of components of said exhaust gas heater, said length-compensating arrangement including at least one length-compensating element in a connecting-force transmission path between said at least one connecting element and at least one of the following:
            i) said carrier arrangement; and,
            ii) said heating conductor arrangement;
    said at least one connecting element passing through said at least one length-compensating element.

2. An exhaust gas heater for an exhaust gas system of an internal combustion engine, the exhaust gas heater defining a longitudinal axis (L) and comprising:
    a carrier arrangement including two carrier elements following one another in the direction of said longitudinal axis (L);
    a heating-conductor arrangement carried on said carrier arrangement and having at least one heating conductor through which current flows, said two carrier elements of said carrier arrangement accommodating said heating conductor arrangement therebetween;
    at least one carrier-element supporting unit for carrying said at least one heating conductor in an electrically insulating manner with respect to said carrier arrangement;
    a connecting arrangement for securely connecting said heating-conductor arrangement to said carrier arrangement, said connecting arrangement including at least one connecting element configured as a bolt extending in the direction of said longitudinal axis (L) and passing through said at least one carrier-element supporting unit; and,
    a length-compensating arrangement for compensating for different thermal expansions of components of said exhaust gas heater, said length-compensating arrangement including at least one length-compensating element in a connecting-force transmission path between said at least one connecting element and at least one of the following:
        i) said carrier arrangement; and,
        ii) said heating conductor arrangement; said at least one connecting element passing through said at least one length-compensating element.

3. The exhaust gas heater of claim 2, wherein the heating-conductor arrangement comprises:
    a first heating conductor and a second heating conductor through which current flows;
    at least one heating-conductor supporting unit for carrying said first heating conductor in an electrically insulated manner with respect to said second heating conductor.

4. The exhaust gas heater of claim 2, wherein:
    said at least one connecting element is arranged in accordance with at least one of the following:
        i) in a supporting path between at least one of said carrier elements and said heating conductor arrangement;
        ii) in a supporting path between a first heating conductor of said heating-conductor arrangement and a second heating conductor of said heating conductor arrangement; and,
        iii) in a supporting path between at least one of said two carrier elements and said at least one connecting element.

5. The exhaust gas heater of claim 4, wherein at least one of the following applies:
    i) said at least one length-compensating element is arranged between one of said two carrier elements and said carrier arrangement supporting unit;
    ii) said at least one length-compensating element is arranged between said first and second heating conductors; and,
    iii) said at least one length-compensating element is arranged between one of said two carrier elements and a connecting-element supporting region of said at least one connecting element supporting itself on the carrier element.

6. The exhaust gas heater of claim 2, wherein said at least one length-compensating element is made from a material having a greater coefficient of thermal expansion than the material of said at least one connecting element.

7. The exhaust gas heater of claim 6, wherein said at least one connecting element is made from a nickel-chromium alloy material and said at least one length-compensating element is made from a steel material.

8. The exhaust gas heater of claim 7, wherein said steel material is 1.4980 steel.

9. The exhaust gas heater of claim 2, wherein at least one of the following applies:
   i) said carrier arrangement is made from a metal material; and,
   ii) said heating-conductor arrangement is made from a metal material.

\* \* \* \* \*